(12) United States Patent
Hosono

(10) Patent No.: US 7,092,704 B2
(45) Date of Patent: Aug. 15, 2006

(54) PORTABLE TELEPHONE SYSTEM CONTAINING PORTABLE TELEPHONE TERMINAL

(75) Inventor: Shizu Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 528 days.

(21) Appl. No.: 10/298,940

(22) Filed: Nov. 19, 2002

(65) Prior Publication Data

US 2003/0100294 A1   May 29, 2003

(30) Foreign Application Priority Data

Nov. 29, 2001 (JP) ............................. 2001-364571

(51) Int. Cl.
*H04M 3/00* (2006.01)

(52) U.S. Cl. ................. 455/420; 455/411; 379/93.03

(58) Field of Classification Search ........... 455/421, 455/456.2, 457, 418–420; 379/93.02, 93.03
See application file for complete search history.

(56) References Cited

U.S. PATENT DOCUMENTS

| | | | | |
|---|---|---|---|---|
| 5,731,785 A | * | 3/1998 | Lemelson et al. | 342/357.07 |
| 6,388,612 B1 | | 5/2002 | Neher | |
| 6,505,048 B1 | * | 1/2003 | Moles et al. | 455/456.1 |
| 6,813,498 B1 | * | 11/2004 | Durga et al. | 455/456.1 |

FOREIGN PATENT DOCUMENTS

| | | |
|---|---|---|
| EP | 1 233 378 A1 | 8/2002 |
| JP | 8-317455 A | 11/1996 |
| JP | 9-284833 A | 10/1997 |
| JP | 11-178047 A | 7/1999 |
| JP | 2000-4482 A | 1/2000 |
| JP | 2000-221881 A | 8/2000 |
| JP | 2001-45562 A | 2/2001 |
| JP | 2001-148740 A | 5/2001 |
| JP | 2002-135840 A | 5/2002 |
| WO | WO 02/060209 A1 | 8/2002 |

* cited by examiner

*Primary Examiner*—Fan Tsang
*Assistant Examiner*—Hemant Patel
(74) *Attorney, Agent, or Firm*—Sughrue Mion, PLLC

(57) ABSTRACT

A portable telephone system comprising first portable telephone terminal, second portable telephone terminal and a server for performing a management of position information of the first portable telephone terminal. The server is a relay server for position search service and registers into a password managing data base a password for allowing the second portable telephone terminal to search the position of the first portable telephone terminal in advance. The first portable telephone terminal notifies the password registered in the password managing data base to the second portable telephone terminal with a mail or the like. The second portable telephone terminal achieving the password transmits a position search request message to the server. The server checks the password indicated by the search request message, allows the position search and issues a search instructing message to the first portable telephone terminal.

10 Claims, 6 Drawing Sheets

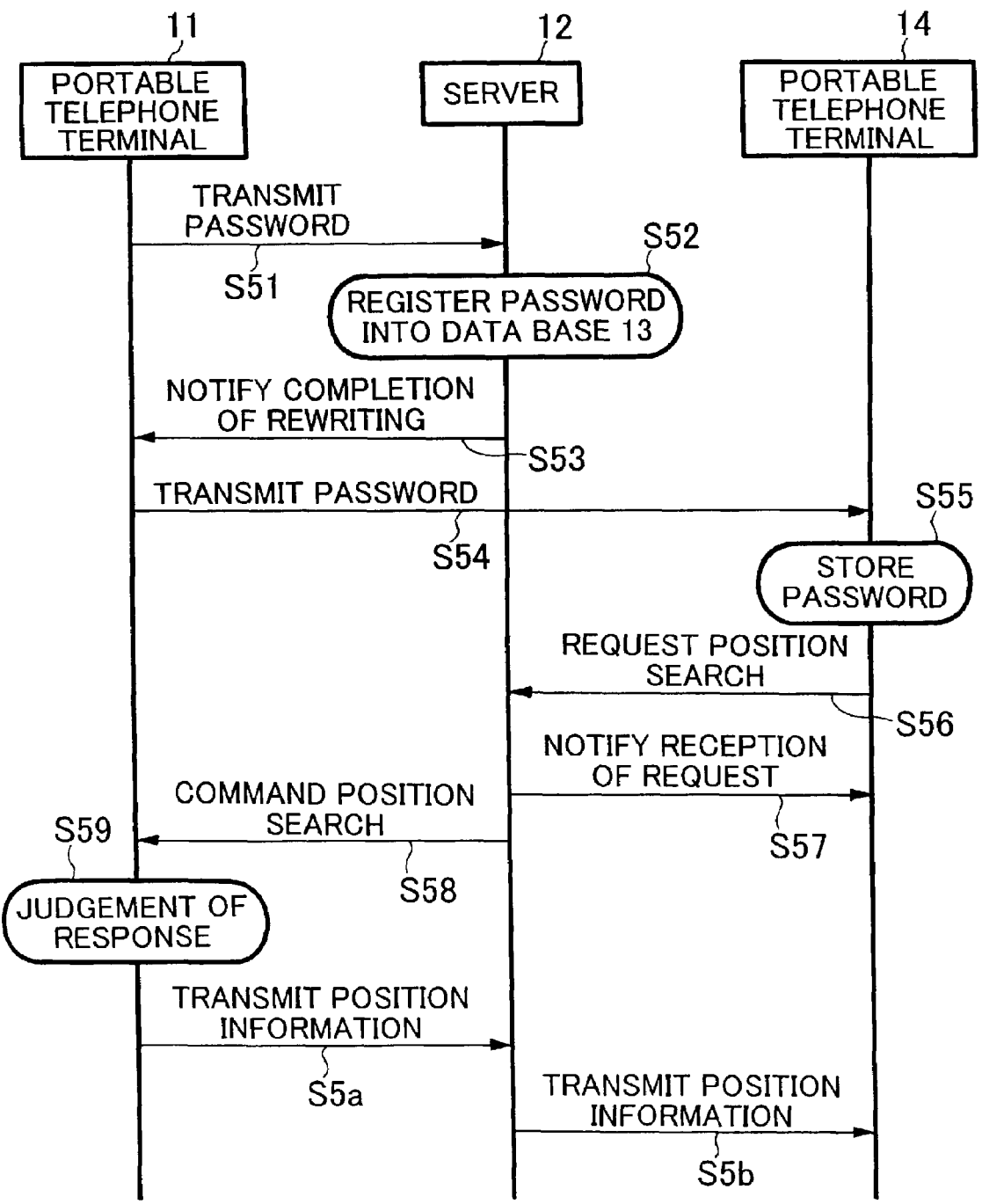

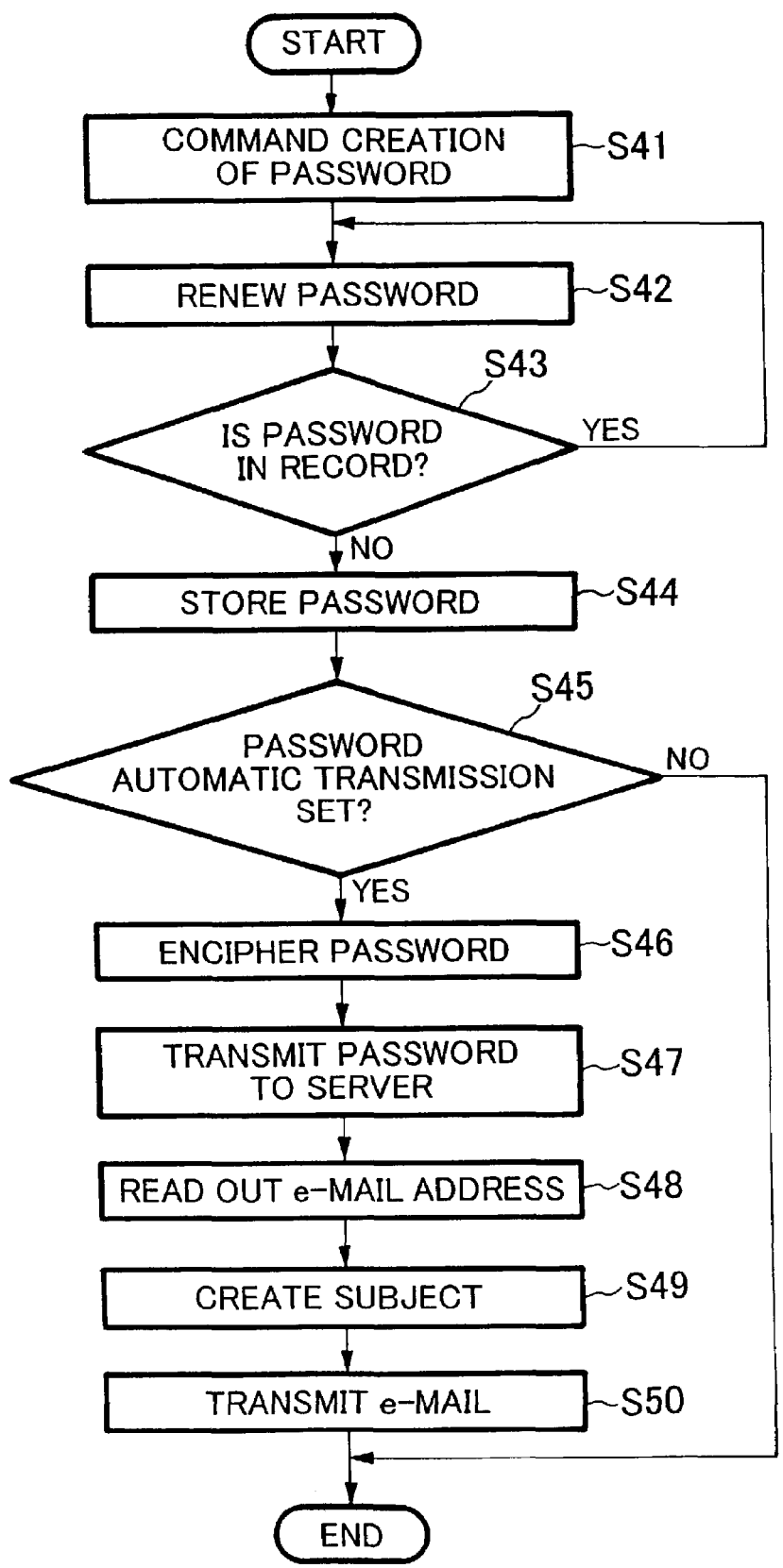

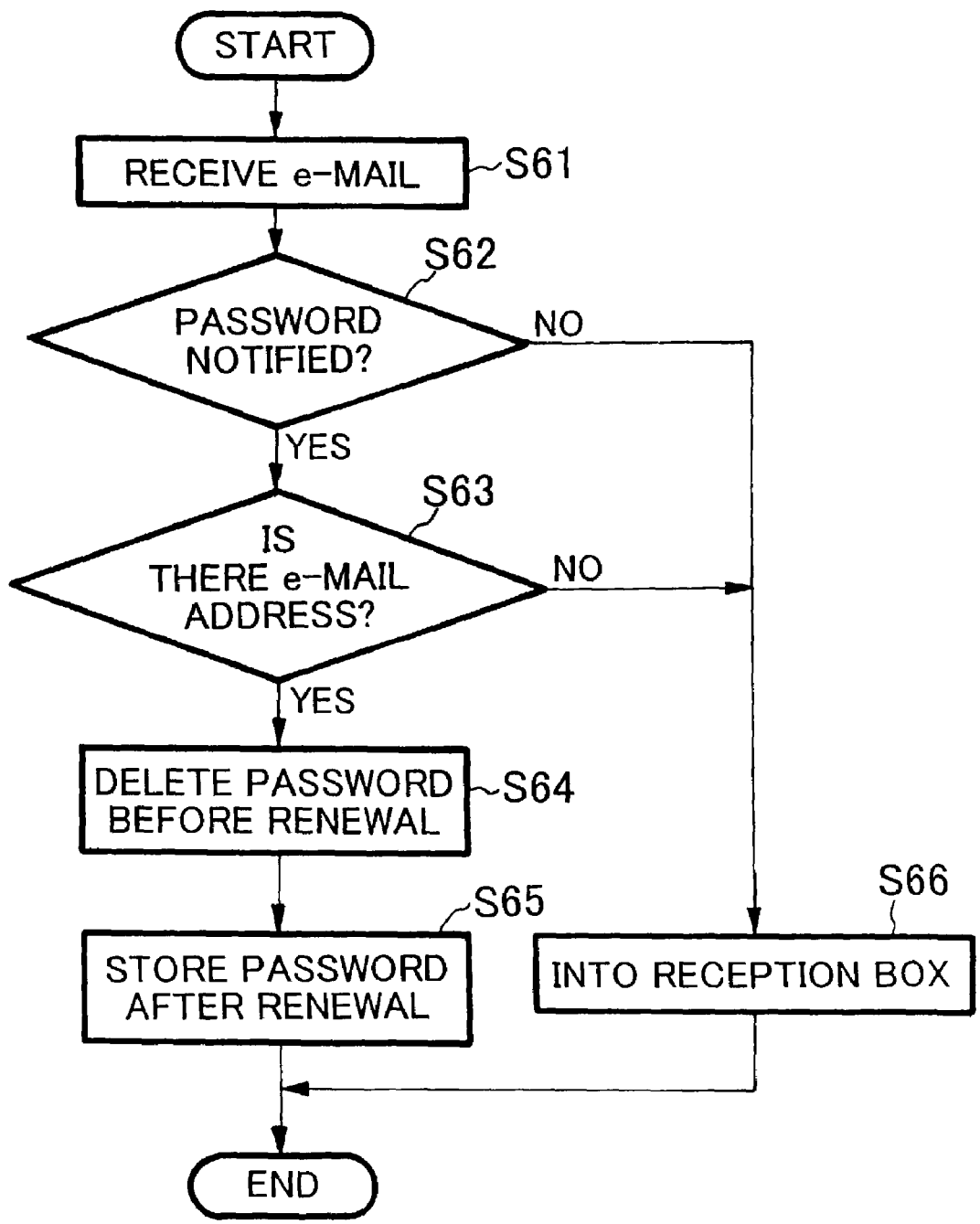

PORTABLE TELEPHONE SYSTEM CONTAINING PORTABLE TELEPHONE TERMINAL

BACKGROUND OF THE INVENTION

1. Field of the Invention

The present invention relates to a portable telephone (for example, cellular phone) system and particularly, to a portable telephone system containing a portable telephone terminal which can search the position thereof or the position of another terminal.

2. Description of the Related Art

There has been known a portable telephone terminal (for example, cellular phone) which can search the position thereof or the position of another terminal by using a global positioning system (GPS) satellite or the like. In order to search the position of another terminal, it is necessary to get a password from the other terminal side prior to the searching.

In order to create the password, a combination of, for example, four digits is selected by the user of the other terminal, and the password thus created is transmitted (told) to only persons who are allowed to perform the position search. The transfer of the password may be performed orally or in other manners. A person which the password is transmitted inputs his/her own terminal.

According to the conventional technique described above, the creation and transmission of a password are performed by the user of a portable telephone terminal, and it is strongly required to transmit the password with no leakage, so that advancement of convenience for users has been required to portable telephone terminals.

Passwords are required to be periodically renewed to prevent the leakage thereof, however, the same disadvantage as described above occurs when the passwords thus renewed are transmitted. Further, a password is usually determined by a user so that it corresponds to a sequence of numbers familiar to the user. Therefore, if a past selected password is determined as a renewal password, the countermeasure to the leakage would become insignificant, and thus an improvement in this point has been required.

JPA-11-178047 discloses a wireless portable terminal which can easily get position information of the wireless portable terminal owned by a user. The wireless portable terminal is equipped with incoming-call automatic-answering control means for automatically answering to the incoming call through wireless communications, position information getting means for getting prescribed position information, position information transmitting means for transmitting position information, and control means for controlling the position information getting means to get the position information at the time of the incoming-call automatic answering and controlling the position information transmitting means to transmit the position information to a calling source.

Further, JPA-9-284833 discloses a position search system for mobile terminals in which the position of a mobile terminal to be searched can be determined with no telephone call. The position search system comprises search-side mobile terminals for searching the latest current positions of mobile terminals to be searched, and mobile terminals to be searched which are located in wireless areas (cells) which are not necessarily coincident with the wireless areas of the search-side mobile terminals. Each mobile terminal to be searched includes storage means for inputting and storing the latest current position information thereof, and transmission means for transmitting the latest current position information when predetermined personal identification number and search code transmitted from a search-side mobile terminal are received and coincident with those of the mobile terminal concerned to be searched.

However, the JPA-11-178047 discloses no technique of getting the position information of another portable telephone terminal, and the JPA-9-284833 has no disclosure of a specific method of creating passwords (personal identification numbers). Therefore, it is difficult to improve the convenience by using even these techniques.

SUMMARY OF THE INVENTION

Therefore, an object of the present invention is to improve the convenience of portable telephone terminals when the passwords on the portable telephone terminal are transmitted.

Further, another object of the present invention is to prevent leakage of passwords on portable telephone terminals.

In order to attain the above object, a portable telephone system according to the present invention includes: at least one first portable telephone terminal containing executing means for executing a service prepared by a business owner, creating means for creating a password to allow other terminals to request execution of the service to be carried out by the executing means and transmission means for transmitting the password created by the creating means;

at least one second portable telephone terminal containing reception means for receiving the password transmitted from the first portable telephone terminal, a password memory for storing the password received by the reception means, and control means for requesting the executing means of the first portable telephone terminal to execute the service by using the password stored in the password memory; and at least one server containing a data base for registering the password created by the first portable telephone terminal, collating means for collating the password registered in the data base with the password used by the second portable telephone terminal when the second portable telephone terminal makes a service executing request to the first portable telephone terminal, and command means for commanding the first portable telephone terminal to carry out the position search when it is judged in the collating means that both the passwords are coincident with each other.

BRIEF DESCRIPTION OF THE DRAWINGS

FIG. 4 is a sequence diagram showing the operation of the portable telephone system of FIG. 1;

FIG. 5 is a flowchart showing the operation of transmitting a renewed password from the portable telephone terminal 11 to the portable telephone terminal 14 in FIG. 1;

FIG. 6 is a flowchart showing a series of operations from the reception of the password of the portable telephone terminal 14 of FIG. 1 until storage of the password into password memory 33.

DETAILED DESCRIPTION OF THE PREFERRED EMBODIMENT

A preferred embodiment according to the present invention will be described hereunder with reference to the accompanying drawings.

[Description of Construction]

Figure 1:
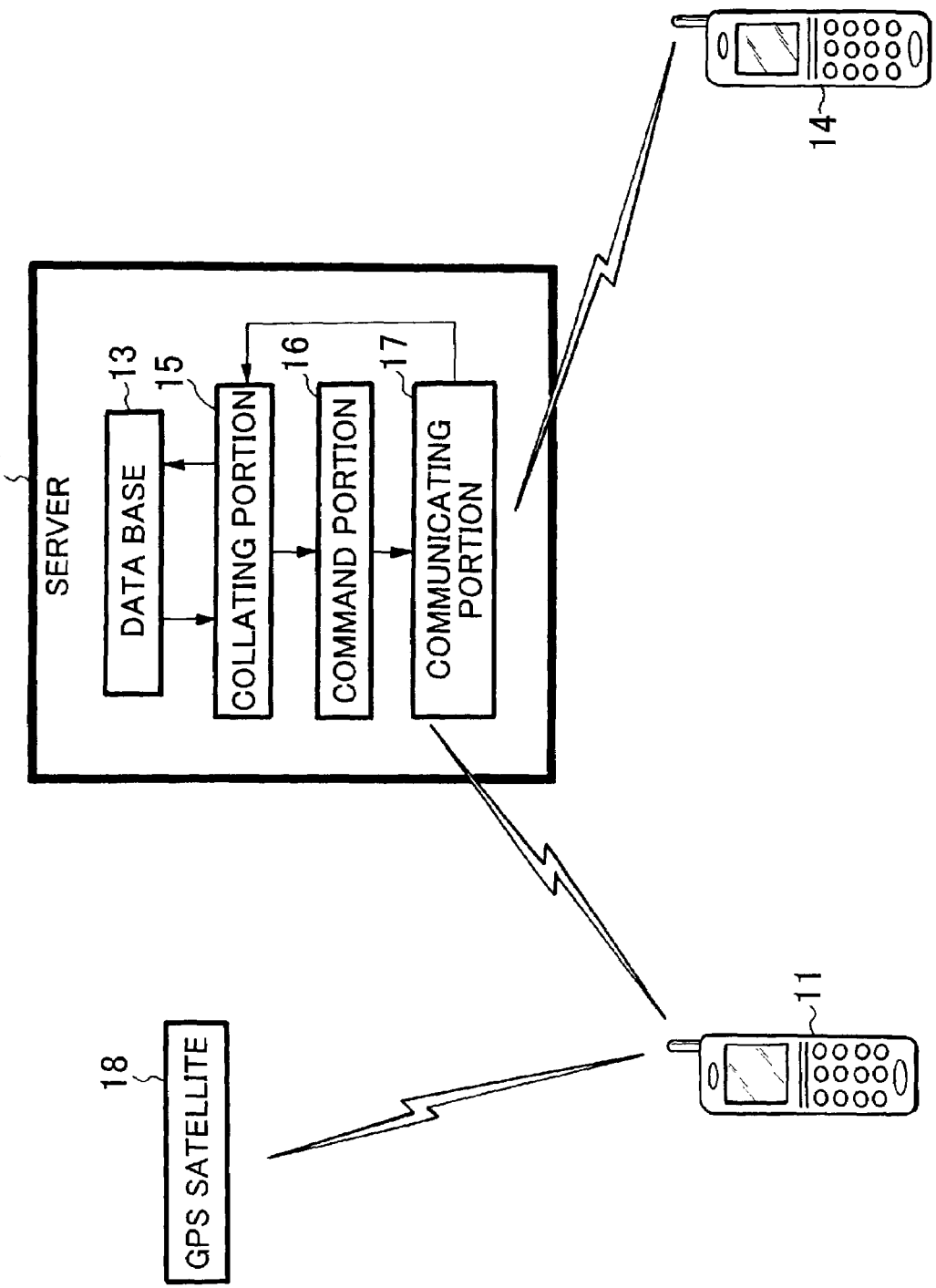
FIG. 1 is a diagram showing a portable telephone system according to an embodiment of the present invention.
Figure 2:
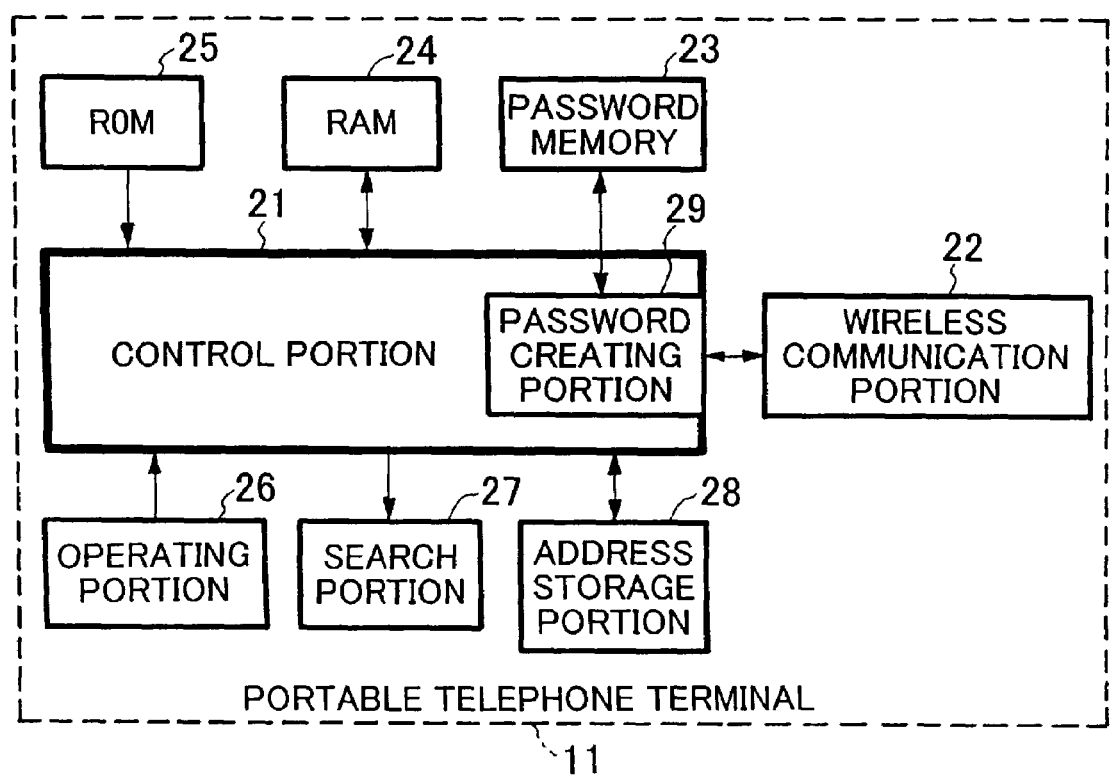
FIG. 2 is a block diagram showing the internal construction of portable telephone terminal 11 of FIG. 1.
Figure 3:
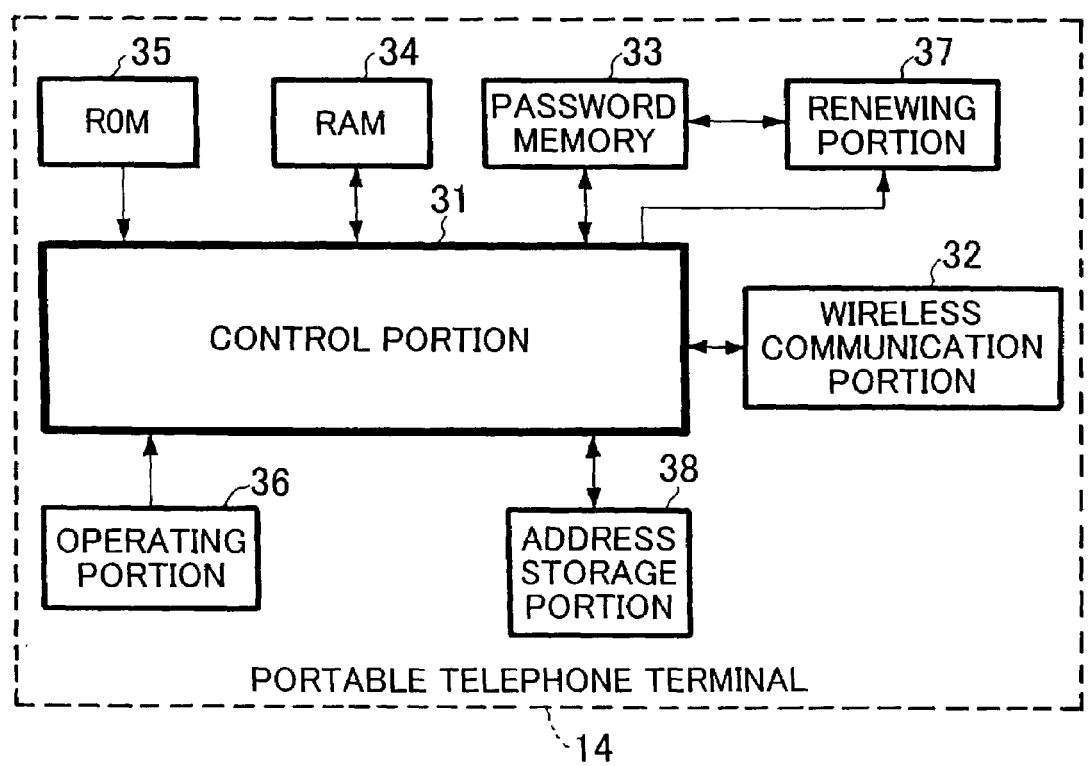
FIG. 3 is a block diagram showing the internal construction of portable telephone terminal 14 of FIG. 1.

FIG. 1 is a diagram showing the construction of a portable telephone (cellular phone, for example) system according to an embodiment of the present invention, FIG. 2 is a block diagram showing the internal construction of portable telephone terminal 11 of FIG. 1, and FIG. 3 is a block diagram showing the internal construction of portable telephone terminal 14 of FIG. 1.

The portable telephone system shown in FIG. 1 includes portable telephone terminal (for example, cellular phone) 11 for searching the position at which it is located, portable telephone terminal 14 (for example, cellular phone) 14 which makes an executing request for performing position search of the portable telephone terminal 11, server 12 for commanding the position search to the portable telephone terminal 11 in response to the request of the portable telephone terminal 14. The portable telephone terminal 11 performs by using GPS satellite 18 the search of the position at which the portable telephone terminal 11 itself is located.

The server 12 is equipped with data base 13 for registering a password which is created by the portable telephone terminal 11 and will be transmitted to a portable telephone terminal to which a position search request is allowed, collating portion 15 for collating the password registered in the data base 13 with a password used when the portable telephone terminal 14 makes an executing request for performing position search of the portable telephone terminal 11, command portion 16 for commanding the portable telephone terminal 11 to carry out the position search when it is judged in the collating portion 15 that both the passwords are coincident with each other, and communication portion 17 for performing communications with the portable telephone terminals 11 and 14.

In FIG. 1, the GPS satellite 18 is illustrated as one. However, plural GPS satellites 18 are actually provided, and when the position search is carried out, electronic waves are received/transmitted between the portable telephone terminal 11 and each of three or four GPS satellites, for example.

The portable telephone terminal 11 may perform the position search on the basis of electronic waves which are received/transmitted from/to three or more base stations (not shown) in place of the GPS satellites 18. Besides, the server 12 may be equipped with search portion 27 (FIG. 2) described below, and the portable telephone terminal 11 may perform the position search on the basis of the electronic waves received/received between the server 12 and the GPS satellites 18 and the electronic waves received/transmitted between the portable telephone terminal 11 and the GPS satellites 18 under the state that the mutual position information between the server 12 and the portable telephone terminal 11 is got in advance.

The portable telephone terminal 11 shown in FIG. 2 includes search portion (functioning as executing means) 27 for searching on the basis of electronic waves received/transmitted from/to the GPS satellites 18 the position at which the portable telephone terminal 11 itself is located, password creating portion 29 for creating a password to allow other terminals to request execution of the position search of the portable telephone terminal 11 itself, wireless communication portion (functioning as transmission means) 22 for transmitting the password created by the password creating portion 29 to the portable telephone terminal 14 and the server 12 or receiving commands from the server 12, password memory (functioning as record memory) 23 for storing the password created by the password creating portion 29 and the record thereof, address storage portion (functioning as transmission destination memory, that is, address book) 28 for storing each transmission destination of the password and the name, telephone number and E-mail address of each transmission destination as a set, read-out/write-in memory (hereinafter referred to as "RAM") 24 for storing information indicating whether a password after renewal should be transmitted to the portable telephone terminal 14 without any instruction of the user of the portable telephone terminal 11, read only memory (hereinafter referred to as "ROM") 25 for recording programs for executing the operation of the main body of the portable telephone terminal 11, operating portion 26 such as numerical keys, etc. which are pressed by the user of the portable telephone terminal 11 or the like, and control portion 21 for controlling the operation of the main body of the portable telephone terminal 11 according to the programs stored in ROM 25.

The password creating portion 29 encrypts (enciphers) a created password to keep secrecy of the password and refers to the record of the passwords stored in the password memory 23 to create a password which was not past used.

Information indicating whether a password after renewal should be automatically transmitted or not is stored in the address storage portion (address book) 28 every e-mail address, for example.

The control portion 21 contains a timer, and commands the password creating portion 29 to renew the password every week or every month, for example.

The portable telephone terminal 14 shown in FIG. 3 includes wireless communication portion (functioning as reception means) 32 for receiving a password transmitted from the portable telephone terminal 11 or requesting the server 12 to execute the position search of the portable telephone terminal 11, password memory 33 for storing a password received by the wireless communication portion 32 while it is paired with the e-mail address allocated to the portable telephone terminal serving as a transmission source, for example, renewal portion 37 for renewing the password stored in the password memory 33 without annunciating the renewal with an image or sounds, address storage portion (address book) 38 having the same construction as the address storage portion (address book) 28, RAM 34 having the same construction as RAM 24, ROM 35 having the same construction as ROM 25, operating portion 36 having the same construction as the operating portion 26 and control portion 31 having the same construction as the control portion 21.

The wireless communication portion 32 decodes an encrypted and transmitted password. The control portion 31 makes a request of executing the position search of the portable telephone terminal 11 according to an instruction of the user.

[Description of Operation]

FIG. 4 is a sequence diagram which schematically shows the operation of the portable telephone system shown in FIG. 1. FIG. 5 is a flowchart showing the operation of transmitting a renewed password from the portable telephone terminal 11 to the portable telephone terminal 14 in FIG. 1. FIG. 6 is a flowchart showing a series of operations from the reception of the password of the portable telephone terminal 14 of FIG. 1 until the storage of the password into the password memory 33.

First, the operation of the portable telephone system will be described with reference to the sequence diagram of FIG. 4.

The portable telephone terminal 11 transmits to the server 12 a registration request message of a password after renewal (step S51).

The portable telephone terminal 11 may create plural passwords and transmit these different passwords to other portable telephone terminals so that the other portable telephone terminals are ranked to be discriminated from one another, for example, the other portable telephone terminals are discriminated into a group to which the password concerned is notified for a short term and another group to which the password concerned is notified for a long term. Further, the renewal frequency may be varied every password to rank the secrecy of the passwords and then the passwords thus ranked may be transmitted.

When receiving the password after renewal transmitted from the portable telephone terminal 11, the server 12 rewrites the password after renewal onto the password of the portable telephone terminal 11 registered in the data base 13 (step S52)

After the rewriting of the password is completed, the server 12 returns a message indicating the completion of the password to the portable telephone terminal 11 (step S53). When plural passwords are registered in the server 12, not only rewriting of the password, but also addition of registration are performed, and a message indicating this point is returned.

When receiving a message returned from the server 12, the portable telephone terminal 11 transmits the password after renewal to the portable telephone terminal 14 (step S54).

When receiving the password after renewal transmitted from the portable telephone terminal 11, the portable telephone terminal 14 stores the password concerned therein (step S55). The portable telephone terminal 14 may store the password concerned therein with no annunciation.

When the portable telephone terminal 14 wants to search the position of the portable telephone terminal 11, the portable telephone terminal 14 transmits to the server 12 a position search request message with the password thus stored (step S56).

When receiving the position search request message transmitted from the portable telephone terminal 14, the server 12 notifies a message indicating the reception of the request message to the portable telephone terminal 14 (step S57).

The server 12 judges whether the password of the portable telephone terminal 11 transmitted from the portable telephone terminal 14 is coincident with the password of the portable telephone terminal 11 registered in the data base 13. If these passwords are coincident with each other, the server 12 commands the portable telephone terminal 11 to perform the position search (step S58). On the other hand, if these passwords are different from each other, the server 12 returns a notification indicating the non-coincidence to the portable telephone terminal 14.

According to the position searching command from the server 12, the portable telephone terminal 11 displays on a monitor the fact that the position search is requested from the portable telephone terminal 14, or emits sounds from a speaker, thereby promoting the user to input his/her instruction as to whether the position search request should be fulfilled.

When the user of the portable telephone terminal 11 inputs his/her instruction, it is judged whether this instruction is to accept the position search request (step S59).

As a result of the judgment, if the instruction is not to accept the position search request, the portable telephone terminal 11 returns a message rejecting the position search request to the portable telephone terminal 14 through the server 12.

When the position search request is frequently made to the portable telephone terminal 11 from a portable telephone terminal which is rejected from requesting the position search to the portable telephone terminal 11, the portable telephone terminal 11 transmits to the portable telephone terminal concerned a dummy password added with information instructing to delete the password which has been registered until now, thereby rejecting the position search to the portable telephone terminal concerned.

The portable telephone terminal receiving the dummy password makes a position search request through the server 12 by using the password thus received. However, the password concerned is not collated in the server 12, and thus the position search command is not transmitted to the portable telephone terminal 11.

On the other hand, as a result of the judgment, if the instruction inputted by the user corresponds to an acknowledgement to the position search request, the portable telephone terminal 11 receives/transmits electronic waves from/to the GPS satellite 18 to search the position at which the portable telephone terminal 11 itself is located (step S5a).

When completing the position search, the portable telephone terminal 11 transmits the position information to the server 12. When receiving the position information of the portable telephone terminal 11, the server 12 transmits the position information of the portable telephone terminal 11 to the portable telephone terminal 14 (step 5b). As described above, the telephone terminal 14 gets the position information of the portable telephone terminal 11.

Next, the operation of transmitting the renewed password from the portable telephone terminal 11 to the portable telephone terminal 14 in FIG. 1 will be described with reference to the flowchart shown in FIG. 5.

First, at the portable telephone terminal (11) side, a time period to output a password renewal command is set in the control portion 21 in advance by the user.

The control portion 21 sets the period set by the user in a timer, and outputs a password creating command to the password creating portion 29 when the timer is time-out (step S41). The control portion 21 executes the standby processing to sounds or packet communications until the timer is time-out.

The password creating portion 29 renews the password when the password creating command is outputted from the control portion 21 (step S42). At this time, it is judged whether the password thus renewed exists in a password record stored in the password memory 23 (step S43).

As a result of the judgment, if the renewed password exists in the password record stored in the password memory 23, the password creating portion 29 renews a password again so that the password concerned does not exist in the record of the password memory 23. The password creating portion 29 stores the password thus renewed into the password memory 23 (step S44).

Subsequently, the control portion 21 refers to RAM 24 to confirm whether automatic transmission of the new password for the portable telephone terminal 14 and server 12 is set (step S45).

As a result of the judgment, if it is judged that the automatic transmission of the new password is set, the password creating portion 29 encrypts (enciphers) the new (renewed) password according to a protocol such as SSL (Secure Socket Layer) or the like and then transmitted to the wireless communication portion 22 (step S46). On the other hand, if the automatic transmission of the new password is not set, the processing shown in FIG. 4 is finished. In this case, the user of the portable telephone terminal 11 manually transmits the renewed password to the server 12 and the portable telephone terminal 14.

The wireless communication portion 22 transmits to the server 12 the password encrypted by the password creating portion 29 (step S47).

Thereafter, when receiving from the server 12 a return message indicating that the password of the data base 13 is rewritten, the control portion 21 reads out an e-mail address added with information indicating transmission of the renewed password, containing the portable telephone terminal 14 stored in the address storage portion (address book) 28 (step S48).

Thereafter, the control portion 21 creates a subject to be added to an e-mail which will be transmitted to notify the renewed password to the portable telephone terminal 14 (step S49). The subject is a mark or sentence indicating that the renewed password is transmitted.

Thereafter, the control portion 21 reads out the passwords before/after the renewal stored in the password memory 23, attaches these passwords to the body text of the e-mail and transmits them by using the wireless communication portion 22 (step S50).

The operations of the control portion 21, etc. are carried out according to the programs stored in ROM 25.

Next, a series of operations from the reception of the password of the portable telephone terminal 11 until the storage thereof into the password memory 33 will be described with reference to the flowchart of FIG. 6.

The portable telephone terminal 14 receives the e-mail attached with the renewed password from the portable telephone terminal 11 by the wireless communication portion 32 (step S61).

The wireless communication portion 32 decodes the e-mail thus received and then outputs it to the control portion 31.

The control portion 31 refers to the subject of the e-mail outputted from the wireless communication portion 32 to judge whether the subject is a password-notifying e-mail (step S62).

As a result of the judgment, if the e-mail outputted from the wireless communication portion 32 is not a password notifying e-mail, the control portion 31 stores the e-mail into a reception box (step S66).

On the other hand, if the e-mail outputted from the wireless communication portion 32 is a password-notifying e-mail, the control portion 31 displays the reception of the e-mail on the monitor or outputs it with sounds from a speaker to notify to the user, and then outputs the e-mail to the renewing portion 37.

When receiving the e-mail outputted from the control portion 31, the renewing portion 37 refers to the address storage portion (address book) 38 on the basis of the mail address of the transmission source of the e-mail concerned to judge whether the e-mail address is registered or not (step S63).

As a result of the judgment, if the mail address of the transmission source of the e-mail outputted from the control portion 31 is not registered in the address storage portion (address book) 38, the control portion 31 stores the e-mail into the reception box (step S66).

On the other hand, if the mail address of the transmission source of the e-mail outputted from the control portion 31 is registered in the address storage portion (address book) 38, the e-mail is outputted to the renewing portion 37 with neither displaying the reception of the e-mail on the monitor nor emitting it with sounds from the speaker.

The renewing portion 37 refers to the password memory 33 on the basis of the e-mail address of the e-mail outputted from the control portion 21 to delete the password of the portable telephone terminal 11 stored in the password memory 33 (step S64). Then, the renewing portion 37 stores the renewed (new) password as being paired with the e-mail address of the portable telephone terminal 11 into an area from which the old password has been deleted (step S65).

The operations of the control portion 31, etc. are carried out according to the programs stored in ROM 35.

As described above, the portable telephone terminal 14 carries out the position search request of the portable telephone terminal 11 by using the renewed password achieved without leakage to the outside.

As described above, the present embodiment has been described by applying to a case where a password is needed when the portable telephone terminal 14 carries out the position search of the portable telephone terminal 11. However, the present embodiment may be applied to such a case that a password is needed to other allowance or authentication.

For example, the above embodiment is modified so that a password is required to be input when a telephone call is made to the portable telephone terminal 11 or an e-mail is transmitted to the portable telephone terminal 11. In this case, if no e-mail after renewal is transmitted to a portable telephone terminal that the acceptance of calls are rejected by the portable telephone terminal 11, the call from the portable telephone terminal concerned can be rejected in the portable telephone terminal 11.

In the above-described embodiment, the portable telephone system including one portable telephone terminal 11, one portable telephone terminal 14 and one server 12 as shown in FIG. 1 is assumed to make the description of the present embodiment easier. However, the respective numbers of portable telephone terminals 11 and 14 and the servers are not limited to one, and they may be set to two or more numbers.

As described above, according to the present embodiment, the convenience at the time of transmission of the password of a portable telephone terminal can be enhanced.

Further, the leakage of the password on the portable telephone terminal can be prevented.

What is claimed is:

1. A portable telephone system, comprising:
at least one first portable telephone terminal containing executing means for executing a service, creating means for creating a password to allow other terminals to request execution of the service to be carried out by said executing means and transmission means for transmitting the password created by said creating means;
at least one second portable telephone terminal containing reception means for receiving the password transmitted from said first portable telephone terminal, a password memory for storing the password received by said reception means, and control means for requesting said executing means of said first portable telephone terminal to execute the service by using the password stored in said password memory; and at least one server containing a data base for registering the password created by said first portable telephone terminal, collating means for collating the password registered in said data base with the password used by said second portable telephone terminal when said second portable telephone terminal makes a service executing request to said first portable telephone terminal, and command means for commanding said first portable telephone terminal to carry out the execution of the service when it is judged in said collating means that both the passwords are coincident with each other.

2. The portable telephone system as claimed in claim 1, wherein the service is a service of searching the position at which said first portable telephone terminal itself is located, or a service of rejecting acceptance of a telephone call or mail.

3. The portable telephone system as claimed in claim 1, wherein said creating means encrypts the password created, and said reception means decodes the password encrypted.

4. The portable telephone system as claimed in claim 1, wherein said first portable telephone terminal is further equipped with a record memory for storing a record of passwords created by said creating means, and said creating means refers to the record of the passwords stored in said record memory to renew the password to a password which was not used past.

5. The portable telephone system as claimed in claim 1, wherein said first portable telephone terminal is equipped with a transmission destination memory for storing transmission destinations of the password, and said transmission means transmits the password to the transmission destination stored in said transmission destination memory.

6. The portable telephone system as claimed in claim 5, wherein the transmission destinations of the password are stored in said transmission destination memory so that each transmission destination and the name, telephone number and e-mail address thereof make a set with each other.

7. The portable telephone system as claimed in claim 6, wherein said transmission means transmits the password every mail address stored in said transmission destination memory.

8. The portable telephone system as claimed in claim 3, wherein said second portable telephone terminal stores the password received by said reception means into said password memory with no annunciation.

9. The portable telephone system as claimed in claim 1, wherein plural passwords are created by said first portable telephone terminal, and the respective passwords are renewed at different frequencies.

10. The portable telephone system as claimed in claim 1, wherein said first portable telephone terminal transmits information of forcedly-deleting a password to a portable telephone terminal to which the password has been already transmitted and rejection of the position search request is requested.

* * * * *